(12) United States Patent
Liu

(10) Patent No.: US 12,239,901 B2
(45) Date of Patent: Mar. 4, 2025

(54) GAMEPAD AND CONTROL STICK FEEDBACK FORCE DEVICE THEREOF

(71) Applicant: GOERTEK INC., Shandong (CN)

(72) Inventor: Zhenzhen Liu, Shandong (CN)

(73) Assignee: GOERTEK INC., Shandong (CN)

( * ) Notice: Subject to any disclaimer, the term of this patent is extended or adjusted under 35 U.S.C. 154(b) by 267 days.

(21) Appl. No.: 17/904,988

(22) PCT Filed: Oct. 31, 2020

(86) PCT No.: PCT/CN2020/125621
§ 371 (c)(1),
(2) Date: Aug. 25, 2022

(87) PCT Pub. No.: WO2021/169375
PCT Pub. Date: Sep. 2, 2021

(65) Prior Publication Data
US 2023/0139154 A1    May 4, 2023

(30) Foreign Application Priority Data
Feb. 28, 2020  (CN) .......................... 202010130072.3

(51) Int. Cl.
*A63F 13/24*     (2014.01)
*A63F 13/285*    (2014.01)

(52) U.S. Cl.
CPC ............ *A63F 13/24* (2014.09); *A63F 13/285* (2014.09)

(58) Field of Classification Search
CPC . A63F 13/24; A63F 13/285; A63F 2300/1037
USPC .......................................................... 463/37
See application file for complete search history.

(56) References Cited

U.S. PATENT DOCUMENTS

| 2002/0080116 | A1* | 6/2002 | Onodera | G05G 9/047 345/161 |
| 2007/0054737 | A1 | 3/2007 | Burgel et al. | |
| 2008/0256941 | A1* | 10/2008 | Bertolasi | G05G 9/047 60/422 |

FOREIGN PATENT DOCUMENTS

| CN | 105204524 A | 12/2015 |
| CN | 205886188 U | 1/2017 |
| CN | 110109505 A | 8/2019 |
| CN | 111318011 A | 6/2020 |
| CN | 111330263 A | 6/2020 |
| CN | 111346368 A | 6/2020 |
| CN | 111359202 A | 7/2020 |

* cited by examiner

*Primary Examiner* — Michael C Grant
(74) *Attorney, Agent, or Firm* — LKGlobal | Lorenz & Kopf, LLP

(57) ABSTRACT

A gamepad and a control stick feedback force device thereof are disclosed. It comprises a control stick that is configured to accept a user's operation and is rotatably installed in a casing of the gamepad. It further comprises: a front friction plate and a rear friction plate that are disposed oppositely, and a pressing device for providing a pressing force between the front friction plate and the rear friction plate, the rear friction plate is fixedly connected with a rotating shaft of the control stick, the front friction plate is connected with a torque output device for driving the front friction plate to rotate, and the front friction plate applies a torque to the rear friction plate under the pressing force of the pressing device to form a feedback force to the control stick.

20 Claims, 4 Drawing Sheets

GAMEPAD AND CONTROL STICK FEEDBACK FORCE DEVICE THEREOF

CROSS-REFERENCE TO RELATED APPLICATION

This application is a U.S. National-Stage entry under 35 U.S.C. § 371 based on International Application No. PCT/CN2020/125621, filed Oct. 31, 2020 which was published under PCT Article 21(2) and which claims priority to Chinese Application No. 202010130072.3, filed Feb. 28, 2020, which are all hereby incorporated herein in their entirety by reference.

TECHNICAL FIELD

This application pertains to the technical field of electronic equipment, more specifically, to a gamepad, and also to a control stick feedback force device of the gamepad.

BACKGROUND

With the development and progress of technology, the popularity of mobile games is increasing, and the requirements for the operation of gamepads are also becoming higher. At present, most gamepads on the market have a control stick, which can rotate in the casing, and users can control the control stick to achieve the corresponding game operation. Please refer to FIG. 1, which is a schematic view of the structure of a control stick in the prior art. The control stick 01 can rotate in the casing 02.

Conventional control sticks mostly return their original position by a spring, which is usually difficult to provide the operator an appropriate feedback force. When operating the control stick, the user needs to feel the action on the control stick by means of the controlled object on the screen, and the hand feel in operation is poor.

In sum, the problems such as how to effectively improve the hand feel in operating the control stick of the gamepad are currently to be solved by those skilled in the art. In addition, other objects, desirable features and characteristics will become apparent from the subsequent summary and detailed description, and the appended claims, taken in conjunction with the accompanying drawings and this background.

SUMMARY

In view of this, a first object of the present disclosure is to provide a control stick feedback force device of a gamepad. The structural design of the control stick feedback force device can effectively solve the problem of poor hand feel in operating the control stick of the gamepad. A second object of the present disclosure is to provide a gamepad comprising the above control stick feedback force device.

In order to achieve the above first object, the present disclosure provides the following technical solutions.

A control stick feedback force device of a gamepad, comprising a control stick that is configured to accept a user's operation and is rotatably installed in a casing of the gamepad, wherein the control stick feedback force device further comprises: a front friction plate and a rear friction plate that are disposed oppositely, and a pressing device that is configured to provide a pressing force between the front friction plate and the rear friction plate, the rear friction plate is fixedly connected with a rotating shaft of the control stick, the front friction plate is connected with a torque output device that is configured to drive the front friction plate to rotate, and the front friction plate applies a torque to the rear friction plate under the pressing force of the pressing device to form a feedback force to the control stick.

Preferably, in the control stick feedback force device, the pressing device comprises: a coil, a current supply module for supplying a current to the coil, and a magnetic element disposed opposite to the coil; the magnetic element or the coil is installed on a side of the front friction plate that is away from the rear friction plate; and a magnetic force generated by the coil interacts with the magnetic element to form a pressing force that presses the rear friction plate.

Preferably, in the control stick feedback force device, the magnetic element is a permanent magnet.

Preferably, the control stick feedback force device further comprises an adjustment module configured to accept the user's operation and generate a corresponding adjustment signal, the adjustment module is electrically connected with the current supply module, and the current supply module is configured to control a magnitude of an output current according to the adjustment signal.

Preferably, the control stick feedback force device further comprises a transmission gear set, an input end of the transmission gear set is connected with an output shaft of the torque output device, and an output end of the transmission gear set is fixedly connected with an end of the front friction plate that is away from the rear friction plate.

Preferably, in the control stick feedback force device, the magnetic element is rotatably installed on the output end of the transmission gear set, and a rotating shaft of the magnetic element is coaxial with a rotating shaft of the output end of the transmission gear set.

Preferably, in the control stick feedback force device, the rotating shaft of the control stick comprises an X-direction rotating shaft and a Y-direction rotating shaft that are perpendicular to each other, the control stick can rotate relative to the casing around an X-direction and a Y-direction respectively, and the rear friction plate, the front friction plate, the torque output device and the pressing device are provided corresponding to the X-direction rotating shaft and the Y-direction rotating shaft respectively.

Preferably, the control stick feedback force device further comprises a control module that is electrically connected with the torque output device, the control module is configured to control the torque output device to output a forward torque or a reverse torque according to game information.

Preferably, the control stick feedback force device further comprises a position restoring elastic member that is disposed between the control stick and the casing and configured to return the control stick to its original position.

The control stick feedback force device of the gamepad according to the present disclosure comprises a control stick, a front friction plate, a rear friction plate, a pressing device and a torque output device. The control stick is installed in the casing of the gamepad and can accept a user's operation and rotate relative to the casing. The front friction plate and the rear friction plate are disposed oppositely, and the rear friction plate is fixedly connected with a rotating shaft of the control stick. The front friction plate is connected with the output end of the torque output device. The pressing device is configured to provide the pressing force between the front friction plate and the rear friction plate. The torque output by the torque output device is applied to the front friction plate. The front friction plate applies a torque to the rear friction plate under the pressing force of the pressing device to form a feedback force to the control stick.

According to the control stick feedback force device of the gamepad of the present disclosure, when the user operates the control stick to rotate, the torque output device outputs a certain torque and applies it to the front friction plate. Since the pressing device makes the front friction plate press the rear friction plate, the front friction plate rotates under the action of the torque output device, and a sliding friction force is generated between the front friction plate and the rear friction plate, and then the front friction plate applies a torque to the rotating shaft of the control stick via the rear friction plate to form a feedback force to control stick. Therefore, in the process of operating the control stick, the user can not only feel the action on the control stick by means of the controlled object on the screen, but also directly feel the feedback force provided by the control stick itself, and thus obtain a good hand feel in operation. At the same time, the pressing force between the front friction plate and the rear friction plate can be adjusted via the pressing device, and thus the magnitude of the sliding friction force between the front friction plate and the rear friction plate can be adjusted, and then the magnitude of the torque applied by the rear friction plate to the control stick can be adjusted, thereby realizing the adjustment of the feedback force so as to meet the different feedback force needs of users. For example, for different users, the feedback force of control stick can be conveniently adjusted according to their personal habits, thereby further improving the hand feel in operating the control stick.

In order to achieve the second object, the present disclosure also provides a gamepad comprising any of the above control stick feedback force devices. Since the above control stick feedback force device has the above technical effect, the gamepad having the control stick feedback force device should also have the corresponding technical effect.

BRIEF DESCRIPTION OF DRAWINGS

The present invention will hereinafter be described in conjunction with the following drawing figures, wherein like numerals denote like elements, and.

Figure 1:
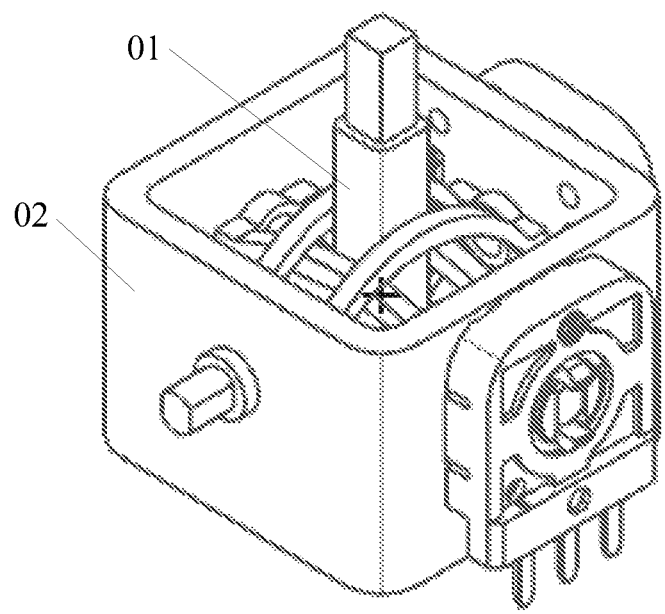
FIG. 1 is a schematic view of the structure of a control stick in the prior art.

In the drawings: control stick 1, casing 2, rotating shaft 3, front friction plate 4, rear friction plate 5, coil 6, magnetic element 7, transmission gear set 8, front fixing plate 9, rear fixing plate 10, bearing 11, transmission shaft 12, magnetic element fixing plate 13, displacement sensor 14.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The embodiments of the present disclosure disclose a control stick feedback force device of a gamepad to improve the hand feel in operating the control stick.

The technical solutions in the embodiments of the present disclosure will be clearly and completely described below in conjunction with the drawings and specific embodiments. Obviously, the embodiments described are only part of, rather than all of, the embodiments of the present disclosure. Based on the embodiments in the present disclosure, all other embodiments obtained by a person of ordinary skill in the art without paying creative work shall fall within the protection scope of the present disclosure.

Figure 2:
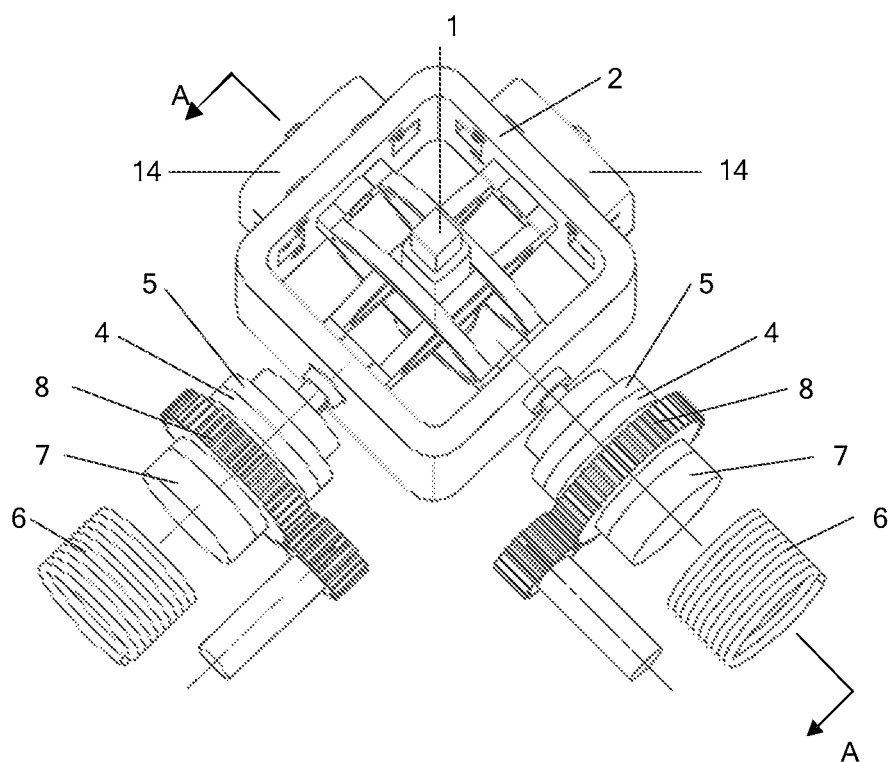
FIG. 2 is a schematic view of the structure of a control stick feedback force device of a gamepad according to a specific embodiment of the present disclosure.
Figure 3:
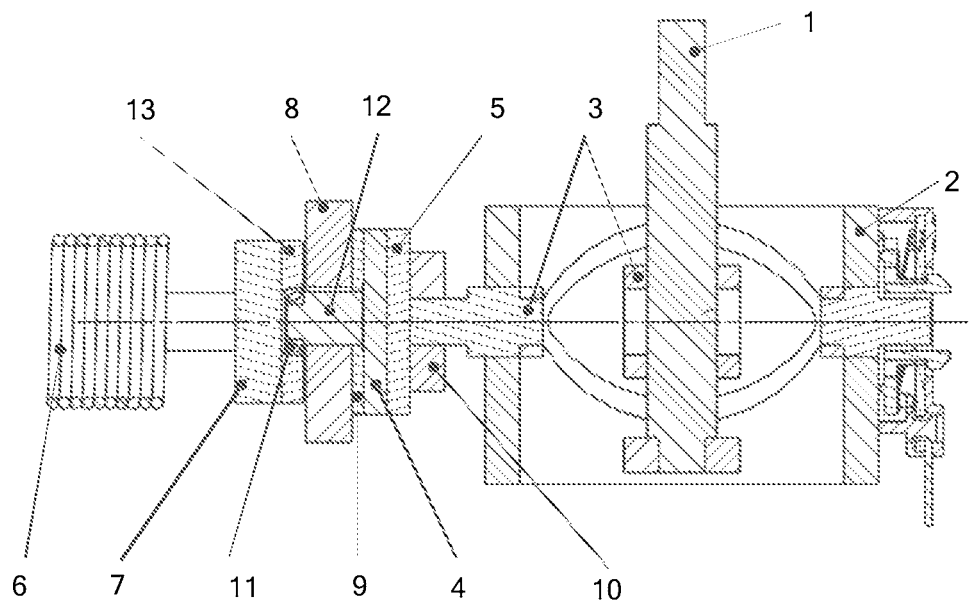
FIG. 3 is a schematic view of A-A section of FIG. 2.
Figure 4:
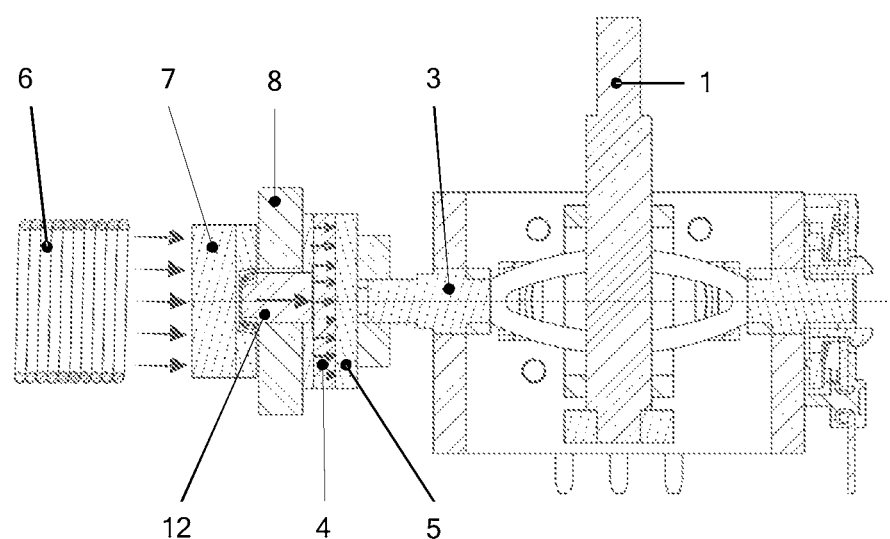
FIG. 4 is a schematic view of a pressing force transmission process.

Please refer to FIG. 2 to FIG. 4. FIG. 2 is a schematic view of the structure of a control stick feedback force device of a gamepad according to a specific embodiment of the present disclosure; FIG. 3 is a schematic view of A-A section of FIG. 2; FIG. 4 is a schematic view of a pressing force transmission process.

In the specific embodiment, the control stick feedback force device of the control stick according to the present disclosure comprises a control stick 1, a front friction plate 4, a rear friction plate 5, a pressing device and a torque output device.

The control stick 1 is installed in a casing 2 of the gamepad, and can accept a user's operation and rotate relative to the casing 2. Namely, the control stick 1 is rotatably installed in the casing 2. Specifically, it can rotate relative to the casing 2 around an X-direction and a Y-direction that are perpendicular to each other. The installation mode of control stick 1 and casing 2 may refer to the prior art and will not be described in detail here. The top end of the control stick 1 generally protrudes from the casing 2 to facilitate accepting the user's operation and swinging along with the user's operation.

The front friction plate 4 and the rear friction plate 5 are disposed oppositely, the rear friction plate 5 is fixedly connected with a rotating shaft 3 of the control stick 1, and the front friction plate 4 is connected with the output end of the torque output device. The front friction plate 4 and the rear friction plate 5 form a friction clutch under the action of the pressing device. The rear friction plate 5 is fixedly connected with the rotating shaft 3 of the control stick 1, specifically, it may be fixedly connected with the rotating shaft 3 of the control stick 1 via a rear fixing plate 10. The front friction plate 4 is connected with the output end of the torque output device, specifically, the output end of the torque output device may be directly and fixedly connected with the front friction plate 4, or indirectly connected with it via a transmission device, etc., which may be set as required. When they are indirectly connected via a transmission device, it is convenient for the layout of various components, and at the same time, the deceleration can be achieved by setting the transmission ratio of the transmission device. The torque output device may be a motor or other conventional equipment that can output a torque. The front friction plate 4 and the rear friction plate 5 are both made of a wear-resistant material.

The pressing device is configured to provide a pressing force between the front friction plate 4 and the rear friction plate 5. Further, under the action of the pressing force, when the torque output device drives the front friction plate 4 to rotate, a sliding friction force is generated between the front friction plate 4 and the rear friction plate 5, and if the pressing force between the front friction plate 4 and the rear friction plate 5 is greater, the sliding friction force will be greater. Further, the sliding friction enables the rear friction plate 5 to apply a torque to the control stick 1, thereby forming a feedback force, i.e., an assisting force or a resisting force to the rotation of the control stick 1. The pressing device may be equipment or components that can provide a pressing force, such as a telescopic cylinder, which will not be described in detail here.

According to the control stick feedback force device of the gamepad of the present disclosure, when the user operates the control stick 1 to rotate, the torque output device outputs a certain torque and applies it to the front friction plate 4. Since the pressing device makes the front friction plate 4 press the rear friction plate 5, the front friction plate 4 rotates under the action of the torque output device, and a sliding friction force is generated between the front friction plate 4 and the rear friction plate 5, and then the front friction plate 4 applies a torque to the rotating shaft 3 of the control stick 1 via the rear friction plate 5 to form a feedback force to control stick 1. Therefore, in the process of operating the control stick 1, the user can not only feel the action on the control stick 1 by means of the controlled object on the screen, but also directly feel the feedback force provided by the control stick 1 itself, and thus obtain a good hand feel in operation. In addition, the feedback force of the control stick 1 is provided by the sliding friction between the front friction plate 4 and the rear friction plate 5. Since the front friction plate 4 and the rear friction plate 5 can slide relative to each other, the adverse effect on the torque output device can be avoided, which helps to prolong its service life. At the same time, the pressing force between the front friction plate 4 and the rear friction plate 5 can be adjusted via the pressing device, and thus the magnitude of the sliding friction force between the front friction plate 4 and the rear friction plate 5 can be adjusted, and then the magnitude of the torque applied by the rear friction plate 5 to the control stick 1 can be adjusted, thereby realizing the adjustment of the feedback force so as to meet the different feedback force needs of users. For example, for different users, the feedback force of control stick 1 can be conveniently adjusted according to their personal habits, thereby further improving the hand feel in operating the control stick 1.

In an embodiment, the pressing device comprises: a coil 6, a current supply module for supplying a current to the coil 6, and a magnetic element 7 disposed opposite to the coil 6. The magnetic element 7 or the coil 6 is installed on the side of the front friction plate 4 that is away from the rear friction plate 5. The magnetic force generated by the coil 6 interacts with the magnetic element 7 to form a pressing force that presses the rear friction plate. The current supply module is installed in the casing 2 to supply a current to the coil 6. Specifically, the current supply module may comprise a power supply, and may also comprise a protection circuit, a control switch, etc. as required. The specific structure of the current supply module may refer to the conventional module structures supplying a current to the coil 6 in the prior art, which will not be described in detail here. Specifically, the magnitude of the current provided by the current supply module is adjustable.

The magnetic element 7 is configured to interact with the magnetic force generated by the coil 6 to form the pressing force from the front friction plate 4 toward the rear friction plate. One of the magnetic elements 7 and the coil 6 is installed on the side of the front friction plate 4 that is away from the rear friction plate 5, as shown in FIG. 3 which is a schematic view of A-A section of FIG. 2. If the side of the front friction plate 4 facing the rear friction plate is the rear side, one of the magnetic elements 7 and the coil 6 is installed on a front end face of the front friction plate 4. Specifically, it may be directly installed on the front end face of the front friction plate 4, or it may be indirectly installed on the front end face of the front friction plate 4 via an installation member. In FIG. 3, the magnetic element 7 is installed on the front end face of the front friction plate 4, and the coil 6 is fixed in the casing 2 and is disposed opposite to the magnetic element 7. Alternatively, the coil 6 is installed on the front end face of the front friction plate 4, and the magnetic element 7 is fixed in the casing 2 and disposed opposite to the coil 6. For the convenience of explanation, it is taken as an example in the description below that the magnetic element 7 is installed on the front end face of the front friction plate 4.

Specifically, the magnetic element 7 may be a permanent magnet. The permanent magnet interacts with the magnetic force generated by the coil 6 to form a pressing force. The permanent magnet has a simple structure, occupies a small space, and produces a large and stable magnetic force. If necessary, the magnetic element 7 may be an electromagnet, that is, the electromagnet interacts with the magnetic force generated by the coil 6 to form a pressing force. However, the electromagnet has a relatively complex structure and occupies a large space. It should be noted that, specifically, the pressing force from front to back between the magnetic element 7 and the coil 6 may be achieved by controlling the direction of a current passing through the coil 6 and the magnetic pole of the magnetic element 7. In order to facilitate the layout and installation of various components, the magnetic element 7 is installed on the front end face of the front friction plate 4, and the coil 6 is disposed in front of the magnetic element 7. By controlling the direction of a current passing through the coil 6 and the magnetic pole of the magnetic element 7, a repulsive force is generated between the coil 6 and the magnetic element 7, thereby pushing the front friction plate 4 to press the rear friction plate 5.

In order to realize the automatic control of the magnitude of the current passing through the coil 6, a control module may be provided, which is connected with the current supply module. When the user rotates the control stick 1, the rotation direction of the control stick 1 can be detected by a sensor. For example, by providing a displacement sensor 14, when the user toggles the control stick 1 to generate a displacement, the displacement sensor 14 detects the position change of the control stick 1 and sends a signal to the control module, and the control module controls the current supply module to output a certain amount of current.

In order to facilitate the adjustment of the magnitude of the feedback force, it further comprises an adjustment module configured to accept the user's operation and generate a corresponding adjustment signal. The adjustment module is electrically connected with the current supply module, and the current supply module is configured to control the magnitude of the output current according to the adjustment signal. That is, by providing the adjustment module to accept the user's adjustment operation and generate a corresponding adjustment signal, the current supply module controls the magnitude of the output current according to the received adjustment signal. The adjustment of the magnitude of the output current changes the magnitude of the pressing force from the front friction plate 4 to the rear friction plate provided by the coil 6 and the magnetic element 7. The change of the magnitude of the pressing force realizes the adjustment of the magnitude of the feedback force of the control stick 1. Thus, the user can conveniently adjust the magnitude of the feedback force of the control stick 1 according to his own habits to obtain a hand feel suitable to himself.

When the pressing device adopts other structures, such as the telescopic cylinder, the adjustment module configured to accept the user's operation and generate the corresponding adjustment signal may be electrically connected with the pressing device, and the pressing device is configured to control the magnitude of the output pressing force according to the adjustment signal.

When the control module is provided, the adjustment module may be electrically connected with the current supply module via the control module, that is, the adjustment module receives the user's adjustment operation and generates a corresponding adjustment signal, and the control module adjusts the magnitude of the current output by the current supply module according to the received adjustment signal. The adjustment module may specifically comprise a touch screen to accept the user's adjustment operations such as a touch. Alternatively, the adjustment module may comprise a knob to accept the user's adjustment operations such as rotation.

In the above embodiment, the connection between the front friction plate 4 and the torque output device may, specifically, be realized by a transmission gear set 8. Namely, it further comprises the transmission gear set 8, the input end of the transmission gear set 8 is connected with the output shaft of the torque output device, and the output end of the transmission gear set 8 is fixedly connected with the end of the front friction plate 4 that is away from the rear friction plate 5. In other words, the input end of the transmission gear set 8 is connected with the output shaft of the torque output device, and the output end is connected with the front end face of the front friction plate 4, so that the torque output by the torque output device is transmitted to the front friction plate 4 via the transmission gear set 8. Specifically, the transmission gear set 8 comprises meshing cylindrical gears. As shown in FIG. 2, it comprises two cylindrical gears. One cylindrical gear is fixedly connected with the front end face of the front friction plate 4. Specifically, they are installed coaxially. The other cylindrical gear is fixedly connected with the output shaft of the torque output device. Thus, the torque output device drives the cylindrical gear that is connected with it to rotate, and the cylindrical gear drives the other cylindrical gear that is meshed with it to rotate, and then drives the front friction plate 4 to rotate. The connection between the front friction plate 4 and the torque output device is realized by the transmission gear set 8, which can play the role of deceleration at the same time.

Figure 7:
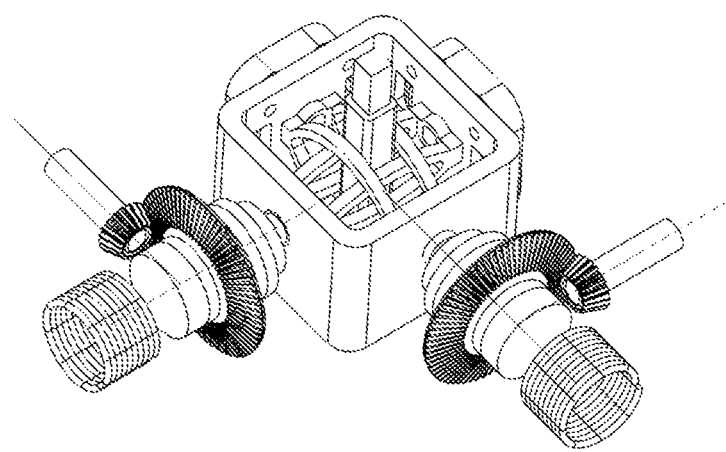
FIG. 7 is a schematic view of bevel gear transmission.

The connection between the front friction plate 4 and the torque output device is not limited to cylindrical gears, and they may be connection through meshing bevel gears as shown in FIG. 7. That is, one of the bevel gears is connected with the output shaft of the torque output device, and the other is fixedly connected with the end of the front friction plate 4 that is away from the rear friction plate 5. Alternatively, the front friction plate 4 and the torque output device may be connected via a worm gear set or via a rack and pinion. However, the rack and pinion is limited by its stroke and occupies a large space.

When the pressing device adopts the coil 6 and the magnetic element 7 cooperating with each other as stated above, specifically, the magnetic element 7 is rotatably installed on the output end of the transmission gear set 8, and the rotating shaft of the magnetic element 7 is coaxial with the rotating shaft of the output end of the transmission gear set 8. Since the front friction plate 4 rotates under the drive of the torque output device, the magnetic element 7 is rotatably connected with the output end of the transmission gear set 8, so that when the output end of the transmission gear set 8 rotates, for example, when the cylindrical gear rotates, it is possible that the magnetic element 7 does not rotate along with the cylindrical gear, thereby ensuring its interaction with the coil 6 to provide a reliable and stable pressing force.

Further, in order to facilitate the installation of various components, the front friction plate 4 is fixedly installed on a front fixing plate 9, and a transmission shaft 12 is coaxially and fixedly connected on the front fixing plate 9. The front friction plate 4 is connected with the cylindrical gear via the transmission shaft 12. The other side of the cylindrical gear is a magnetic element 7, such as a cylindrical permanent magnet. In order to facilitate the installation of the magnetic element 7, a magnetic element fixing plate 13 is provided, and the magnetic element 7 is fixedly installed on the magnetic element fixing plate 13. The magnetic element fixing plate 13 is connected with the transmission shaft 12 via a bearing 11, and maintains a certain gap with the cylindrical gear to ensure that the magnetic element 7 remains stationary when the cylindrical gear rotates.

In the above embodiments, the rotating shaft 3 of the control stick 1 comprises an X-direction rotating shaft and a Y-direction rotating shaft that are perpendicular to each other, the control stick 1 can rotate relative to the casing 2 around an X-direction and a Y-direction respectively. And the rear friction plate 5, the front friction plate 4, the torque output device and the pressing device are provided corresponding to X-direction rotating shaft and a Y-direction rotating shaft respectively. In other words, the control stick 1 can rotate relative to the casing 2 around the X-direction and the Y-direction that are perpendicular to each other; when the control stick 1 rotates relative to the casing 2 around the X-direction, the rotating shaft 3 of the control stick 1 is the X-direction rotating shaft; when the control stick 1 rotates relative to the casing 2 around the Y-direction correspondingly, the rotating shaft 3 of the control stick 1 is the Y-direction rotating shaft. Since the control stick 1 can rotate around different directions, accordingly, the rear friction plate 5, the front friction plate 4, the torque output device and the pressing device are provided corresponding to the X-direction rotating shaft and the Y-direction rotating shaft respectively. In other words, with respect to the X-direction rotating shaft, an X-direction front friction plate and an X-direction rear friction plate are provided; the X-direction rear friction plate is fixedly connected with the X-direction rotating shaft; the X-direction front friction plate is connected with the output end of the X-direction torque output device; the X-direction pressing device is configured to provide the pressing force between the X-direction front friction plate and the X-direction rear friction plate; the X-direction torque output device outputs a torque to the X-direction front friction plate; the X-front friction plate applies a torque to the X-direction rear friction plate under the pressing force of the X-direction pressing device to form a feedback force to the control stick 1. With respect to the Y-direction rotating shaft, a Y-direction front friction plate and a Y-direction rear friction plate are provided; the Y-direction rear friction plate is fixedly connected with the Y-direction rotating shaft; the Y-direction front friction plate is connected with the output end of the Y-direction torque output device; the Y-direction pressing device is configured to provide the pressing force between the Y-direction front friction plate and the Y-direction rear friction plate; the Y-direction torque output device outputs a torque to the Y-direction front friction plate; the Y-front friction plate applies a torque to the Y-direction rear friction plate under the pressing force of the Y-direction pressing device to form a feedback force to the control stick 1. If necessary, the above setting may be made only with respect to the X-direction rotating shaft, or may be made only with respect to the Y-direction rotating shaft, and then the feedback force is provided in the corresponding direction only.

Further, the Y-direction rotating shaft remains stationary when the X-direction rotating shaft rotates relative to the casing 2, and the X-direction rotating shaft remains stationary when the Y-direction rotating shaft rotates relative to the casing 2. In other words, when the control stick 1 rotates around the X-direction, it will not interfere with the Y-direction rotating shaft. Similarly, when the control stick 1 rotates around the Y-direction, it will not interfere with the X-direction rotating shaft. Specifically, it may be achieved through the rotatable installation mode of the control stick 1. The specific installation structure may refer to the rotatable installation mode of the conventional control stick 1 in the prior art, which will not be described in detail here. Of course, when the X-direction rotating shaft rotates relative to the casing 2, if the Y-direction rotating shaft moves along with the X-direction rotating shaft, it only needs to reserve a movement space in the casing 2 correspondingly for the corresponding structures such as the Y-direction torque output device; when the Y-direction rotating shaft rotates relative to the casing 2, if the X-direction rotating shaft moves along with the Y-direction rotating shaft, it only needs to reserve a movement space in the casing 2 correspondingly for the corresponding structures such as the X-direction torque output device.

On the basis of the above embodiments, it further comprises a control module that is electrically connected with the torque output device, and the control module is configured to control the torque output device to output a forward torque or a reverse torque according to the game information. Specifically, the control module generates corresponding control commands according to the game information and controls the direction of the torque output device. The direction of torque corresponds to the forward or reverse rotation of the output shaft of the torque output device. By adjusting the direction of the torque output by the torque output device, the corresponding direction of the feedback force of the control stick 1 is adjusted. Specifically, the control module may be a controller. By providing the control module, specifically, by combining a digital circuit with game scenes, the direction of the torque output by the torque output device can be controlled according to the game information at any time. Specifically, the adjustment of the direction of the output torque can be achieved by controlling the direction of the current passing through the torque output device. If necessary, the control module may also be configured to control the magnitude of the torque output by the torque output device according to the game information.

Specifically, the control module is configured to control the rotation direction of the torque output to the control stick 1 from the torque output device to be the same as the rotation direction of the control stick 1 in scenes of smooth roads, downhill slopes or skiing, and to control the rotation direction of the torque output to the control stick 1 from the torque output device to be opposite to the rotation direction of the control stick 1 in scenes of wind, rain or hill climbing. Of course, the control mode of the control module corresponding to different game scenes is not limited to the above situations, and can be set according to actual needs of game scenes.

When the user rotates the control stick 1, the direction in which the user toggles the control stick 1 is the movement direction of the rear friction plate 5. Specifically, the rotation direction of control stick 1 can be detected by a sensor. For example, by providing a displacement sensor 14, when the control stick 1 is pushed by the user to produce a small displacement, the displacement sensor 14 detects the position change of the control stick 1 and sends a signal to the control module, and the control module controls the torque output device to output a corresponding torque according to the game information. For example, when an assisting force needs to be output according to the game information, the rotation direction of the torque output from the torque output device to the control stick 1 is the same as the rotation direction of the control stick 1; when a resisting force needs to be output according to the game information, the rotation direction of the torque output from the torque output device to the control stick 1 is opposite to the rotation direction of the control stick 1. When the pressing device is electrically connected with the control module, the control module may also be configured to control the magnitude of the torque output by the torque output device according to the game information. In other words, when the torque output device outputs a forward or reverse torque, the magnitude of the torque output by the torque output device can also be controlled to adjust the magnitude of the feedback force.

Take the case that the torque output device is a motor as an example, when an assisting force needs to be output according to the game information, the control module controls the rotation direction of the motor so that the rotation applied to the control stick 1 shares the same rotation direction with the control stick 1. Specifically, the rotation direction of the motor may be controlled by controlling the direction of the current passing through the motor, that is, by controlling so that a current in a certain direction is applied to the motor. If necessary, the speed may also be controlled by controlling the current passing through the motor. When a resisting force needs to be output according to the game information, the control module controls the rotation direction of the motor so that the rotation direction of the rotation applied to the control stick 1 is opposite to the rotation direction of the control stick 1. Specifically, the rotation direction of the motor may be controlled by controlling the direction of the current passing through the motor, that is, by controlling so that a reverse current is applied to the motor. If necessary, the speed may also be controlled by controlling the current passing through the motor. Specifically, the magnitude and the direction of the current input into the motor may be controlled by a program, thereby obtaining different feedback forces in different game scenes and improving the user's game experience.

It can be seen that, by controlling the direction of the torque output by the torque output device according to the game information by the control module, the automatic adjustment of the feedback force of the control stick 1 as an assisting force or a resisting force can be realized, and by controlling the magnitude of the pressing force provided by the pressing device by the control module, the automatic adjustment of the corresponding assisting force or resisting force can be realized, so that different feedback forces can be obtained in different game scenes and the operator's hand feel can be improved.

In sum, by providing the adjustment module and the control module, in different game scenes, the magnitude and direction of the current can be adjusted at any time by combining the digital circuit with game scenes, and different assisting force and resisting force can be applied to the control stick 1 according to the game scenes, thereby obtaining different feedback forces in different game scenes and improving the operator's hand feel. Moreover, players can adjust the magnitude of the feedback force of control stick 1 according to their personal habits to obtain a hand feel suitable to themselves.

Figure 5:
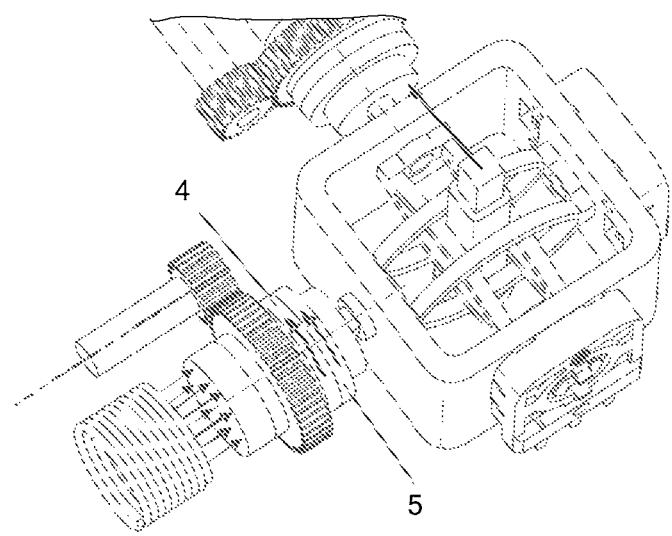
FIG. 5 is a schematic view of providing an assisting force.

Take the following case as an example: the torque output device is a motor and the pressing device uses the coil 6 and the magnetic element 7 in cooperation as stated above. When outputting an assisting force, its working process is shown in FIG. 5. The direction in which the user toggles the control stick 1 is the moving direction of the rear friction plate 5. When the control stick 1 displaces, the displacement sensor 14 transmits a signal to the control module, the control module controls the rotation direction of the motor and then drives the front friction plate 4 to rotate, and makes the rotation direction of the front friction plate 4 consistent with that of the rear friction plate 5. At this moment, since the magnetic force of the magnetic element 7 and the coil 6 presses the front friction plate 4 and the rear friction plate 5, the motor provides an assisting force to the control stick 1 through the friction clutch composed of the front friction plate 4 and the rear friction plate 5. Moreover, when the current in the coil 6 is greater, the press force between the front friction plate 4 and the rear friction plate 5 will be greater, a greater sliding friction force will be produced, and thus the assisting force provided will be greater.

Figure 6:
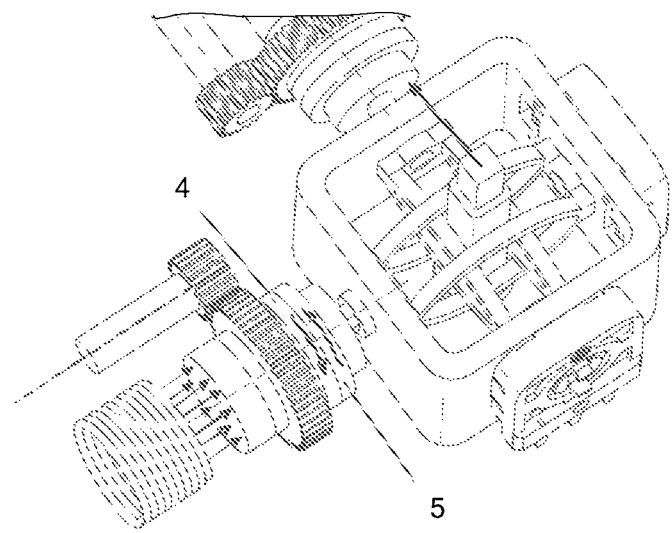
FIG. 6 is a schematic view of providing a resisting force.

When outputting a resisting force, its working process is shown in FIG. 6. When the control stick 1 displaces, the displacement sensor 14 transmits a signal to the control module, the control module controls the rotation direction of the motor and then drives the front friction plate 4 to rotate, and makes the rotation direction of the front friction plate 4 opposite to that of the rear friction plate 5. At this moment, since the magnetic force of the magnetic element 7 and the coil 6 presses the front friction plate 4 and the rear friction plate 5, the motor provides a corresponding resisting force to the control stick 1 through the friction clutch. Moreover, when the current in the coil 6 is greater, the press force between the front friction plate 4 and the rear friction plate 5 will be greater, a greater sliding friction force will be produced, and thus the resisting force provided will be greater.

In the above embodiments, it further comprises a position restoring elastic member disposed between the control stick 1 and the casing 2 for returning the control stick 1 to its original position. In other words, by providing the position restoring elastic member, when the user releases the control stick 1, the control stick 1 can return to its original position (typically, a center position of swinging) under the action of the position restoring elastic member. Of course, when the position restoring elastic member is provided, the position restoring elastic member itself can also provide a certain feedback force, so the user can adjust the torque output by the torque output device as required, and by combining it with the feedback force of the position restoring elastic member, a comprehensive hand feel suitable to the user can be obtained.

Based on the control stick feedback force device provided in the above embodiments, the present disclosure also provides a gamepad, which comprises any control stick feedback force device in the above embodiments. Since the gamepad adopts the control stick feedback force device in the above embodiments, please refer to the above embodiments for the beneficial effect of the gamepad.

The embodiments in this specification are described in a progressive manner. Each embodiment focuses on the differences from other embodiments. The same and similar parts of the embodiments can be referred to each other.

The above description of the disclosed embodiments enables those skilled in the art to realize or use the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments shown herein, but will conform to the widest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A control stick feedback force device of a gamepad, comprising a control stick (1) that is configured to accept a user's operation and is rotatably installed in a casing (2) of the gamepad, wherein
    the control stick feedback force device further comprises:
        a front friction plate (4) and a rear friction plate (5) that are disposed oppositely, and a pressing device that is configured to provide a pressing force between the front friction plate (4) and the rear friction plate (5), the rear friction plate (5) is fixedly connected with a rotating shaft (3) of the control stick (1), the front friction plate (4) is connected with a torque output device that is configured to drive the front friction plate (4) to rotate, and the front friction plate (4) applies a torque to the rear friction plate (5) under the pressing force of the pressing device to form a feedback force to the control stick (1).

2. The control stick feedback force device according to claim 1, wherein
    the pressing device comprises: a coil (6), a current supply module for supplying a current to the coil (6), and a magnetic element (7) disposed opposite to the coil (6);
    the magnetic element (7) or the coil (6) is installed on a side of the front friction plate (4) that is away from the rear friction plate (5); and
    a magnetic force generated by the coil (6) interacts with the magnetic element (7) to form a pressing force that presses the rear friction plate (5).

3. The control stick feedback force device according to claim 2, wherein the magnetic element (7) is a permanent magnet.

4. The control stick feedback force device according to claim 2, further comprising an adjustment module configured to accept the user's operation and generate a corresponding adjustment signal, wherein the adjustment module is electrically connected with the current supply module, and the current supply module is configured to control a magnitude of an output current according to the adjustment signal.

5. The control stick feedback force device according to claim 2, further comprising a transmission gear set (8), wherein an input end of the transmission gear set (8) is connected with an output shaft of the torque output device, and an output end of the transmission gear set (8) is fixedly connected with an end of the front friction plate (4) that is away from the rear friction plate (5).

6. The control stick feedback force device according to claim 5, wherein the magnetic element (7) is rotatably installed on the output end of the transmission gear set (8), and a rotating shaft of the magnetic element (7) is coaxial with a rotating shaft of the output end of the transmission gear set (8).

7. The control stick feedback force device according to claim 2, further comprising a control module that is electrically connected with the torque output device, wherein the control module is configured to control the torque output device to output a forward torque or a reverse torque according to game information.

8. The control stick feedback force device according to claim 1, wherein the rotating shaft (3) of the control stick (1) comprises an X-direction rotating shaft and a Y-direction rotating shaft that are perpendicular to each other, the control stick (1) can rotate relative to the casing (2) around an X-direction and a Y-direction respectively, and the rear friction plate (5), the front friction plate (4), the torque output device and the pressing device are provided corresponding to the X-direction rotating shaft and the Y-direction rotating shaft respectively.

9. The control stick feedback force device according to claim 8, further comprising a control module that is electrically connected with the torque output device, wherein the control module is configured to control the torque output device to output a forward torque or a reverse torque according to game information.

10. The control stick feedback force device according to claim 1, further comprising a control module that is electrically connected with the torque output device, wherein the control module is configured to control the torque output device to output a forward torque or a reverse torque according to game information.

11. The control stick feedback force device according to claim 1, further comprising a position restoring elastic member that is disposed between the control stick (1) and the casing (2) and configured to return the control stick (1) to its Original position.

12. The gamepad comprising the control stick feedback force device according to claim 1.

13. The gamepad according to claim 12, wherein
the pressing device comprises: a coil (6), a current supply module for supplying a current to the coil (6), and a magnetic element (7) disposed opposite to the coil (6);
the magnetic element (7) or the coil (6) is installed on a side of the front friction plate (4) that is away from the rear friction plate (5); and
a magnetic force generated by the coil (6) interacts with the magnetic element (7) to form a pressing force that presses the rear friction plate (5).

14. The gamepad according to claim 13, wherein the magnetic element (7) is a permanent magnet.

15. The gamepad according to claim 13, further comprising an adjustment module configured to accept the user's operation and generate a corresponding adjustment signal, wherein the adjustment module is electrically connected with the current supply module, and the current supply module is configured to control a magnitude of an output current according to the adjustment signal.

16. The gamepad according to claim 13, further comprising a transmission gear set (8), wherein an input end of the transmission gear set (8) is connected with an output shaft of the torque output device, and an output end of the transmission gear set (8) is fixedly connected with an end of the front friction plate (4) that is away from the rear friction plate (5).

17. The gamepad according to claim 16, wherein the magnetic element (7) is rotatably installed on the output end of the transmission gear set (8), and a rotating shaft of the magnetic element (7) is coaxial with a rotating shaft of the output end of the transmission gear set (8).

18. The gamepad according to claim 12, wherein the rotating shaft (3) of the control stick (1) comprises an X-direction rotating shaft and a Y-direction rotating shaft that are perpendicular to each other, the control stick (1) can rotate relative to the casing (2) around an X-direction and a Y-direction respectively, and the rear friction plate (5), the front friction plate (4), the torque output device and the pressing device are provided corresponding to the X-direction rotating shaft and the Y-direction rotating shaft respectively.

19. The gamepad according to claim 12, further comprising a control module that is electrically connected with the torque output device, wherein the control module is configured to control the torque output device to output a forward torque or a reverse torque according to game information.

20. The gamepad according to claim 12, further comprising a position restoring elastic member that is disposed between the control stick (1) and the casing (2) and configured to return the control stick (1) to its Original position.

* * * * *